Dec. 18, 1956 A. A. KILLINGTON 2,774,700
MANUFACTURE OF TRIM PANELS
Filed March 5, 1953
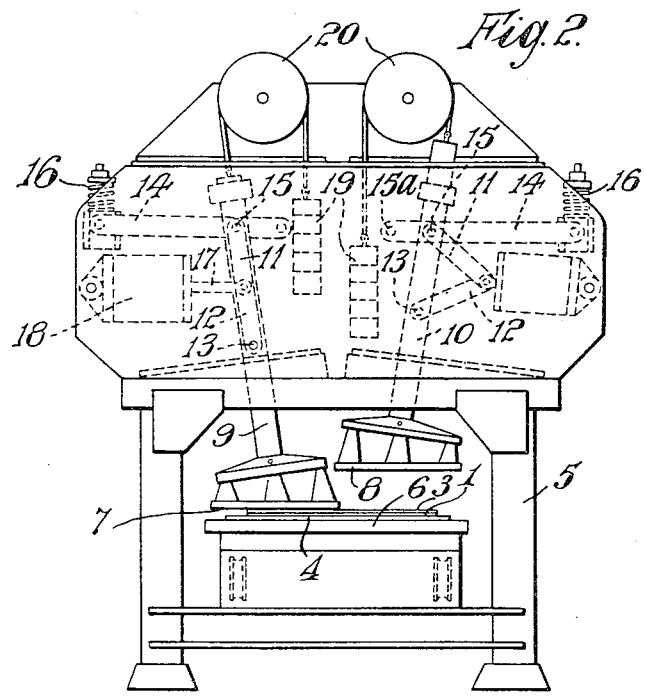
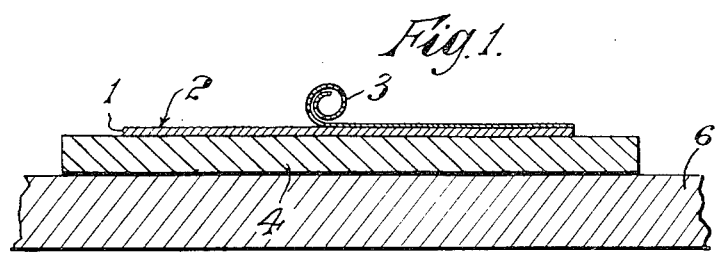
INVENTOR
Albert Arthur Killington
BY
Elmer Jamison Gray
ATTORNEY United States Patent Office 2,774,700
Patented Dec. 18, 1956

2,774,700

MANUFACTURE OF TRIM PANELS

Albert Arthur Killington, Romford, England, assignor to Briggs Manufacturing Co., Detroit, Mich., a corporation of Michigan Application March 5, 1953, Serial No. 340,467

4 Claims. (Cl. 154—126.5)

This invention relates to the manufacture of panel-like members and more particularly to ornamental panels adapted to be used as the inner trim panels of a vehicle body.

Known panels comprise a foundation sheet, for example of cardboard, an intermediate padded layer of wadding or the like and an outer cover of fabric, leather, imitation leather, or other suitable material, the superposed layers being bonded together by the use of phenolic or other thermosetting resin which may be spread over the padding or being used to impregnate sheets of tissue paper which are interposed between the foundation layer and the padding. The superposed layers were adapted to be subjected to heat and pressure in a suitable press to cause the resin to flow and bond the layers together. In the known manufacture the press was heated by steam and to ensure efficient bonding and also to reduce the time which the panels had to remain in the press it has been necessary that the phenolic resin adhesive be partially reacted by advancing to the B stage before the panels were inserted into the press.

It is an object of the present invention to provide an improved trim panel and method and apparatus for manufacturing the same, thereby to provide a panel which can be produced more rapidly and at less cost than has been possible heretofore.

According to the present invention laminated panels including a foundation sheet and a superposed cover sheet are manufactured by the method which includes the steps of providing a layer of artificial resinous material in partially reacted condition between the foundation and cover sheets, and subjecting the assembled sheets to a high frequency electric field to complete the reaction of the resinous material to bond the sheets together.

The phenolic resin is advantageously a monohydric phenol. Preferably it is used when in the A stage that is to say in a partially reacted state so that it is soluble in a common organic solvent, for example acetone, which can be readily sprayed or painted on the foundation sheet. The foundation sheet is roughened or otherwise treated prior to being coated with the resinous material to ensure sufficient penetration of the resin to make a satisfactory bond.

The superposed sheets will normally be pressed between platens of a vertical press provided with high frequency heating means designed to heat the resinous mixture and effect its reaction to the final or C stage.

The use of H. F. heating has the important advantage that complete reaction of the resinous mixture and the efficient bonding together with the superposed sheets may be effected in approximately six seconds as compared with the one to two minutes required in the previously known steam heated press, thereby effecting a considerable saving in the time taken in manufacture and consequently a saving in the final cost of the panel. Further it is not necessary, as in prior arrangements, that the phenolic resin should be partially reacted to the B stage before being inserted into the press and the opportunity of using resin in the A stage enables a further saving to be effected.

It should be noted that on account of the very short time of the heating process the resin should be substantially uncondensed, e. g. in the A stage, as otherwise it may be completely reacted and dry out before there is time for it to flow and make a bond with the sheets.

To enable the invention to be fully understood it will now be described with reference to the accompanying drawing, in which:

Fig. 1 is a sectional view of a laminated panel according to the present invention positioned on a support such as the platen of a press;

Fig. 2 illustrates a suitable form of press for treating the panel by H. F. electrical field to bond the sheets to one another.

As shown in Fig. 1 the panel comprises a foundation sheet 1 of cardboard or other relatively stiff material one face of which is coated, as indicated at 2, with a phenolic resin in the A stage. The resin may be a mono-hydric phenol in solution with a common organic solvent, for example, acetone, the mixture being applied to the sheet as by spraying or painting. A cover sheet 3 of trim material such as leather, imitation leather, fabric or the like is positioned on the coated surface in superposed relation to the foundation sheet 1 and the superposed sheets are mounted on a platen 4 for insertion into a press such as shown in Fig. 2.

As shown the press comprises a frame 5 having a bed 6 to receive the panel and a pair of movable platens 7, 8 supported on arms 9, 10. The arms are adapted to be raised and lowered by toggle means comprising links 11, 12. The free end of the link 12 of each toggle is pivoted to the respective arm at 13 and the free ends of the links 11 are pivoted to levers 14 at the pivotal point 15. The levers 14 are pivoted to the machine frame 5 at 15ᵃ and their opposite ends are resiliently mounted by means of springs 16. The piston rods 17 are provided for actuating the toggle, the rods being pivoted to the pivotal point of the inner ends of the respective links 11, 12. The piston rods are connected with pistons (not shown) reciprocably mounted in cylinders 18 which are adapted to be supplied with fluid under pressure to effect reciprocal movement of the piston and piston rods. The arms 8, 9 are adapted to be balanced by means of weights 19 attached to cords or chains passing round the pulleys 20. It will be noted that the arms 9, 10 extend at an angle to one another and the inner adjacent edges of the platens 7, 8 overlap slightly. This arrangement is desirable to avoid the difficulties experienced in controlling H. F. fields over relatively large areas and enables sections of the panels to be treated, the overlap of the platens ensuring that the full area of the panel wil be subjected to the H. F. field.

In operation the piston rods 17 connected with the respective arms 9, 10 will be alternatively actuated so that the movable platens will be alternately lowered into position, each platen being designed to extend over a section of the panel to subject it to high frequency heating effect and the two platens being so disposed that portions thereof overlap portions of the panel to ensure the efficient heating of the whole area of the panel.

It will be understood that the press for treating the panels may take other forms than that illustrated in the accompanying drawings.

Although phenolic resin has been found to give good results in carrying out the present invention it will be understood that other types of resinous mixtures may be used which are capable of being readily applied to the foundation sheet and which will react to bond the sheets during the period that the later are subjected to H. F. heating.

I claim:
1. The method of manufacturing a laminated panel having a foundation sheet and a superimposed cover sheet, comprising the steps of arranging said sheets on the bed of a press in superimposed relation with a layer of resinous material therebetween in partially reacted condition, successively bonding said sheets together at predetermined sections of said panel by successively moving separate platens against said sections in turn to press the same against said bed, and simultaneously with the pressing of each section subjecting that section to a high frequency electric field to complete the reaction of the resinous material.

2. The method of manufacturing a laminated panel having a foundation sheet and a superimposed cover sheet, comprising the steps of arranging said sheets on the bed of a press in superimposed relation with a layer of resinous material therebetween in partially reacted condition, successively bonding said sheets together at predetermined sections of said panel by successively advancing separate platens against said sections in turn to press the same against said bed, simultaneously with the pressing of each section subjecting that section to a high frequency electric field to complete the reaction of the resinous material, and retracting each platen in turn from its corresponding section after bonding the same and prior to bonding the next successive section.

3. The method of manufacturing a laminated panel having a foundation sheet and a superimposed cover sheet, comprising the steps of arranging said sheets on the bed of a press in superimposed relation with a layer of resinous material therebetween in partially reacted condition, successively bonding together a number of predetermined sections of said panel having overlapping edges by successively advancing a corresponding number of separate platens against said sections in turn to press the same against the said bed, simultaneously with the pressing of each section subjecting that section to a high frequency electric field to complete the reaction of the resinous material, and retracting each platen in turn from its corresponding section after bonding the same and prior to bonding the next successive section.

4. The method of manufacturing a laminated panel having a foundation sheet and a superimposed cover sheet, comprising the steps of arranging said sheets on a generally horizontal bed of a press in superimposed relation with a layer of resinous material therebetween in partially reacted condition, successively bonding together a number of predetermined sections of said panel having overlapping edges by successively advancing a corresponding number of separate platens generally vertically against said sections in turn to press the same against said bed, simultaneously with the pressing of each section subjecting that section to a high frequency electric field to complete the reaction of the resinous material, and retracting each platen in turn generally vertically from its corresponding section after bonding the same and prior to bonding the next successive section.

References Cited in the file of this patent

UNITED STATES PATENTS

| | | |
|---|---|---|
| 2,030,527 | Meyer | Feb. 11, 1936 |
| 2,154,474 | Scott | Apr. 18, 1939 |
| 2,442,115 | Byers et al. | May 25, 1948 |
| 2,453,185 | Bilhuber | Nov. 9, 1948 |
| 2,525,355 | Hoyler | Oct. 10, 1950 |
| 2,565,251 | Malmstrom | Aug. 21, 1951 |
| 2,591,771 | Bergey | Apr. 8, 1952 |
| 2,667,437 | Zoubek | Jan. 26, 1954 |
| 2,678,897 | Mann et al. | May 18, 1954 |

OTHER REFERENCES

Serial No. 229,798 (A. P. C.), published May 11, 1943.
Taylor, November 1943, Issue of Electronics, pages 106–111, 130.